(12) United States Patent
Krishnan et al.

(10) Patent No.: US 11,336,676 B2
(45) Date of Patent: May 17, 2022

(54) CENTRALIZED TRUST AUTHORITY FOR WEB APPLICATION COMPONENTS

(71) Applicant: Tala Security, Inc., Fremont, CA (US)

(72) Inventors: Aanand Krishnan, Fremont, CA (US);
Swapnil Bhalode, San Jose, CA (US);
Siddhesh Yawalkar, San Jose, CA (US); Sanjay Sawhney, Cupertino, CA (US); Hemant Puri, Milpitas, CA (US)

(73) Assignee: Tala Security, Inc., Fremont, CA (US)

( * ) Notice: Subject to any disclaimer, the term of this patent is extended or adjusted under 35 U.S.C. 154(b) by 232 days.

(21) Appl. No.: 16/681,548

(22) Filed: Nov. 12, 2019

(65) Prior Publication Data

US 2020/0153850 A1    May 14, 2020

Related U.S. Application Data

(60) Provisional application No. 62/760,791, filed on Nov. 13, 2018.

(51) Int. Cl.
*H04L 29/06* (2006.01)

(52) U.S. Cl.
CPC ........ *H04L 63/1433* (2013.01); *H04L 63/205* (2013.01)

(58) Field of Classification Search
CPC ... H04L 63/1433; H04L 63/205; H04L 63/14; H04L 63/1441; H04L 63/20; G06F 21/50; G06F 21/51; G06F 21/56; G06F 21/57; G06F 21/577
See application file for complete search history.

(56) References Cited

U.S. PATENT DOCUMENTS

| | | | |
|---|---|---|---|
| 8,516,590 B1* | 8/2013 | Ranadive | H04L 63/1483 726/24 |
| 2007/0169199 A1* | 7/2007 | Quinnell | G06F 21/577 726/25 |
| 2007/0186285 A1* | 8/2007 | Hurst | G06F 21/577 726/25 |

* cited by examiner

*Primary Examiner* — Edward Zee

(57) ABSTRACT

Techniques to facilitate operation of a centralized trust authority for web application components are disclosed herein. In at least one implementation, a plurality of web resources used to construct web applications is received. Over a secure application programming interface (API), component registration information associated with each of the plurality of web resources is received, provided by producers of the web resources. The plurality of web resources is analyzed to determine unique identities and security attributes for each of the web resources. A plurality of security risk factors is identified for each of the plurality of web resources based on the component registration information and the security attributes determined for each of the web resources. A security profile is generated for each of the plurality of web resources based on the security risk factors identified for each of the web resources.

20 Claims, 6 Drawing Sheets

CENTRALIZED TRUST AUTHORITY FOR WEB APPLICATION COMPONENTS

RELATED APPLICATIONS

This application claims the benefit of, and priority to, U.S. Provisional Patent Application No. 62/760,791, entitled "Method for Maintaining and Delivering Trust-based Policies of Web Application Components to Protect Web Applications", filed on Nov. 13, 2018, which is hereby incorporated by reference in its entirety for all purposes.

TECHNICAL BACKGROUND

Application-layer attacks are a major vulnerability of the security industry and are one of the largest sources of data breaches. Application-layer attacks exploit vulnerabilities within an application as well as susceptible components and unsecure coding practices used in building the application. Existing methodologies to protect an application rely on analysis techniques to identify already-published or known bugs and vulnerabilities, and then either requiring the application software developers to fix those bugs and remove the vulnerabilities in the application code, or generating virtual patches that can be configured on network firewalls and intrusion prevention systems to prevent the exploitation of those vulnerabilities. However, this blacklist approach, which attempts to prevent known malicious users, code, or inputs from reaching the application, offers inadequate protection because it only protects against attack vectors and vulnerabilities that have been previously discovered.

Modern web applications integrate code and resources from dozens of third-party service providers, including content delivery networks (CDNs) and third-party JavaScript libraries, and may range in function from user analytics to marketing tags, among other examples. Recent studies have found that almost two thirds of the content and code at websites is loaded from third parties. A significant portion of this content comprises executable scripts with direct security impact on a website. A greater security risk is due to the way in which many advertising platforms are set up, where the advertising host sites may not even be aware of which servers are placing content on the website. In the absence of proper vetting for third-party executable content, this content may be compromised or malicious. Many recent examples of crypto-jacking attacks have transpired involving a third-party library serving crypto-mining code to users from thousands of websites. In addition, recent breaches of user data on many popular websites have been attributed to compromised third-party JavaScript files.

OVERVIEW

Techniques to facilitate operation of a centralized trust authority for web application components are disclosed herein. In at least one implementation, a plurality of web resources used to construct web applications is received. Over a secure application programming interface (API), component registration information associated with each of the plurality of web resources is received, provided by producers of the web resources. The plurality of web resources is analyzed to determine unique identities and security attributes for each of the web resources. A plurality of security risk factors is identified for each of the plurality of web resources based on the component registration information and the security attributes determined for each of the web resources. A security profile is generated for each of the plurality of web resources based on the security risk factors identified for each of the web resources.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

Figure 1:
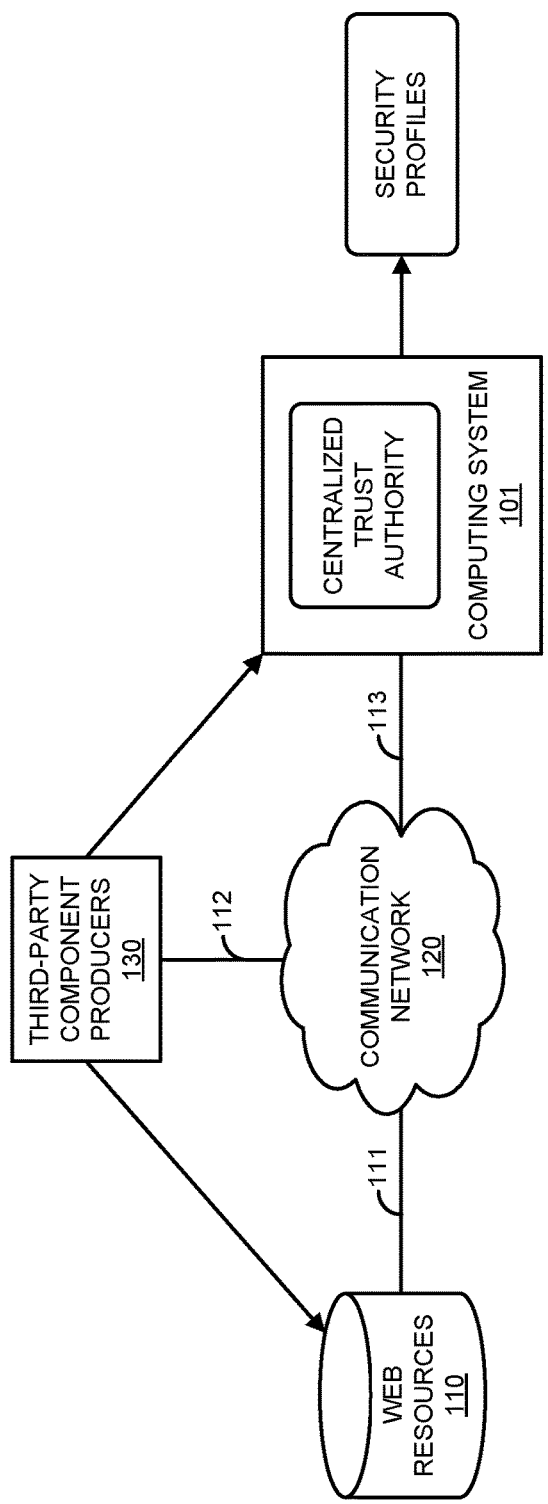
FIG. 1 is a block diagram that illustrates a communication system.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Existing methods of retrieving information about third-party web application components are generally ad-hoc. For commercial components, such as marketing analytics and form builders, vendors may publish integrity hashes, release notes, and other relevant information on their websites. Developers are encouraged to read this information and incorporate it into their design and testing cycles. However, vendors often do not disclose vulnerabilities or any sensitive data collection capabilities within their web application components. Likewise, components available from open-source repositories, such as CDNJS, npm, and others are often not verified and vetted. Recent security standards such as Subresource Integrity (SRI) are difficult to implement in practice due to a lack of systematic workflow that vets commercial vendors and their components along with changes or updates provided by these vendors and other third-party components retrieved from open-source repositories. Unfortunately, such an ad-hoc workflow makes it extremely difficult to differentiate between legitimate and malicious changes to third-party JavaScript libraries and other web application components. In turn, this often leads to false alarms whenever an integrity violation is observed for a particular version of a component. In order to combat this problem, publishers could theoretically use code signing certificates to sign every JavaScript file, library, and any other web application components. However, in practice such code signing does not scale because the client web browser would have to perform a substantial amount of processing in order to verify every external JavaScript file and other components used by a web application, since there could be several dozen JavaScript files in use on a given webpage to verify for authenticity at load time which would slow down the rendering of the page. Further, even if all of the external components that are loaded by a website could be verified by the client browser, this still does not address the scenario of when a publisher's site or code is compromised.

The techniques disclosed herein describe a centralized web resource trust authority that may operate as a cloud service for ingesting, maintaining, and delivering security attributes and integrity information for millions of web objects, such as JavaScript files, libraries, fonts, style sheets, scripts, and other web resources used in construction of a modern website. The centralized trust authority can be queried to determine the integrity and security attributes of a given component used in constructing a web page. The scope of coverage provided by the trust authority service includes both open-source components as well as those provided by commercial vendors. For example, the centralized trust authority provides the ability to register and unregister changes and updates to open-source as well as commercially supported web components. Such component registration helps to enable the centralized trust authority to update protection policies to reflect the latest legitimate updates to a component. Further, by utilizing various object fingerprinting techniques such as fuzzy fingerprinting, abstract syntax trees, and structural hash computations, the centralized trust authority provides a mechanism to uniquely identify a given web component that can tolerate minor variations provided there are no structural differences. The trust authority service also includes mechanisms to infer security attributes directly through analysis of components that are available in their entirety, or indirectly using publically disclosed vulnerabilities, such as national vulnerability database (NVD), open-source security platforms, computer emergency response team (CERT) advisories, and other vulnerability tracking resources to determine if there are known disclosures of vulnerabilities by vendors against any of the web resources. The centralized trust authority also has the ability to absorb incremental changes over time through continuous updates with security characteristics of new objects and newly discovered security attributes of millions of existing objects, which enables the trust authority to provide zero-day vulnerability protection by preemptively detecting malicious exploits of web application components. In at least one implementation, the centralized trust authority provides APIs for ingesting, storing, and delivering security attributes at scale, which may be utilized by web developers, information technology (IT) security personnel, end users, incident responders, risk evaluators, products that automatically enforce policies, or any other uses that would benefit from information about security profiles of various web resources.

Beneficially, the centralized trust authority provides a single source of truth about the security attributes of various web resources utilized extensively at top ranking websites. For example, a web application may be evaluated by referring to the trust authority and proactively warning developers and security personnel about the risks associated with using certain third-party components. For example, the centralized trust authority may proactively identify malicious additions or alternations to a web resource, classify the behavior of the changes, and notify end users of the resultant security implications. The centralized trust authority may also be queried through API calls to retrieve security profiles, reputation scores, and other security attributes for desired web objects identified by one or more fingerprinting algorithms, such as abstract syntax trees. Additionally, hosts of third-party component repositories (such as CDNs) can benefit from the centralized trust authority by ensuring that their repository contents meet certain security criteria.

Figure 2:
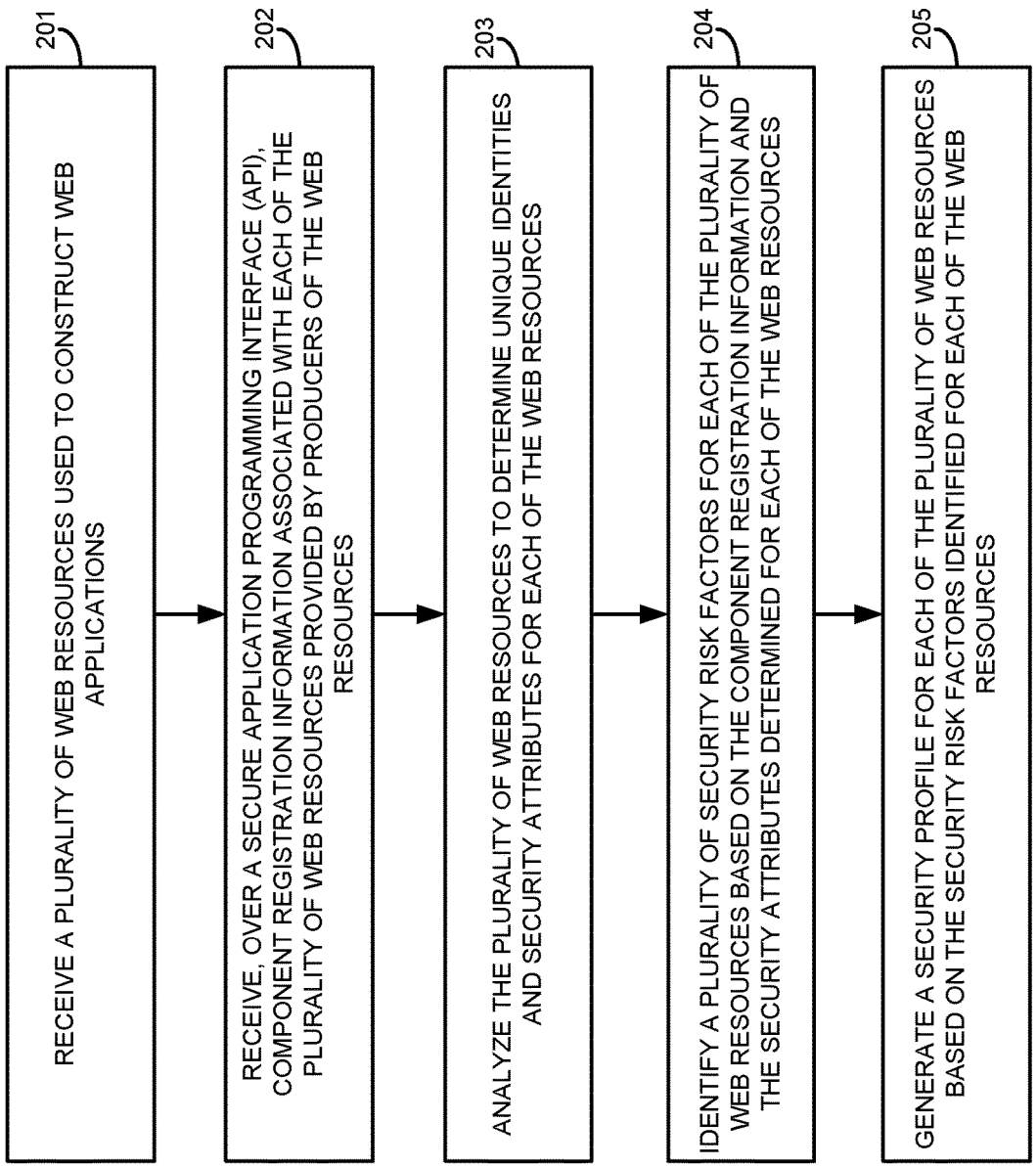
FIG. 2 is a flow diagram that illustrates an operation of the communication system.
Figure 3:
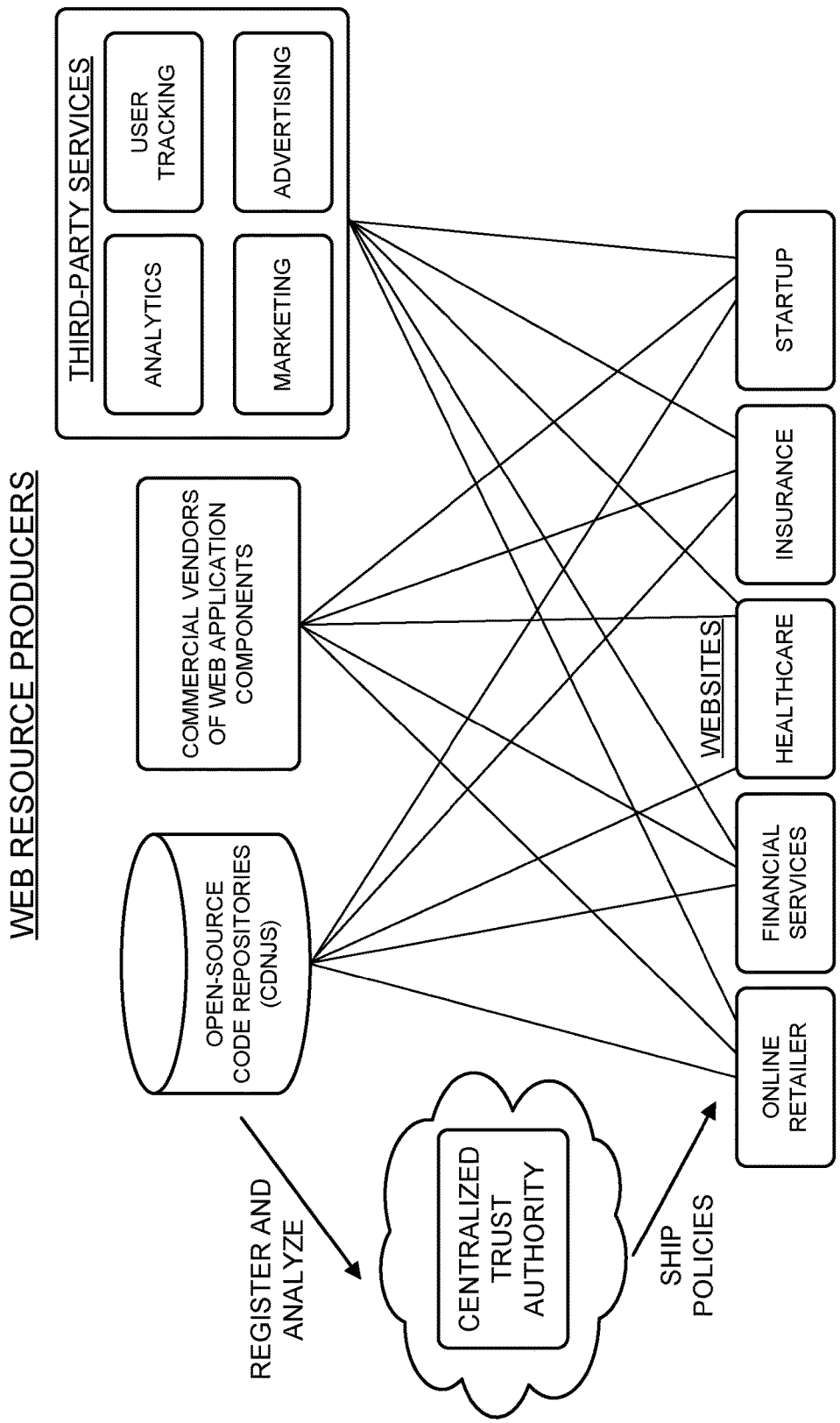
FIG. 3 is a block diagram that illustrates an operation of a communication system in an exemplary embodiment.
Figure 4:
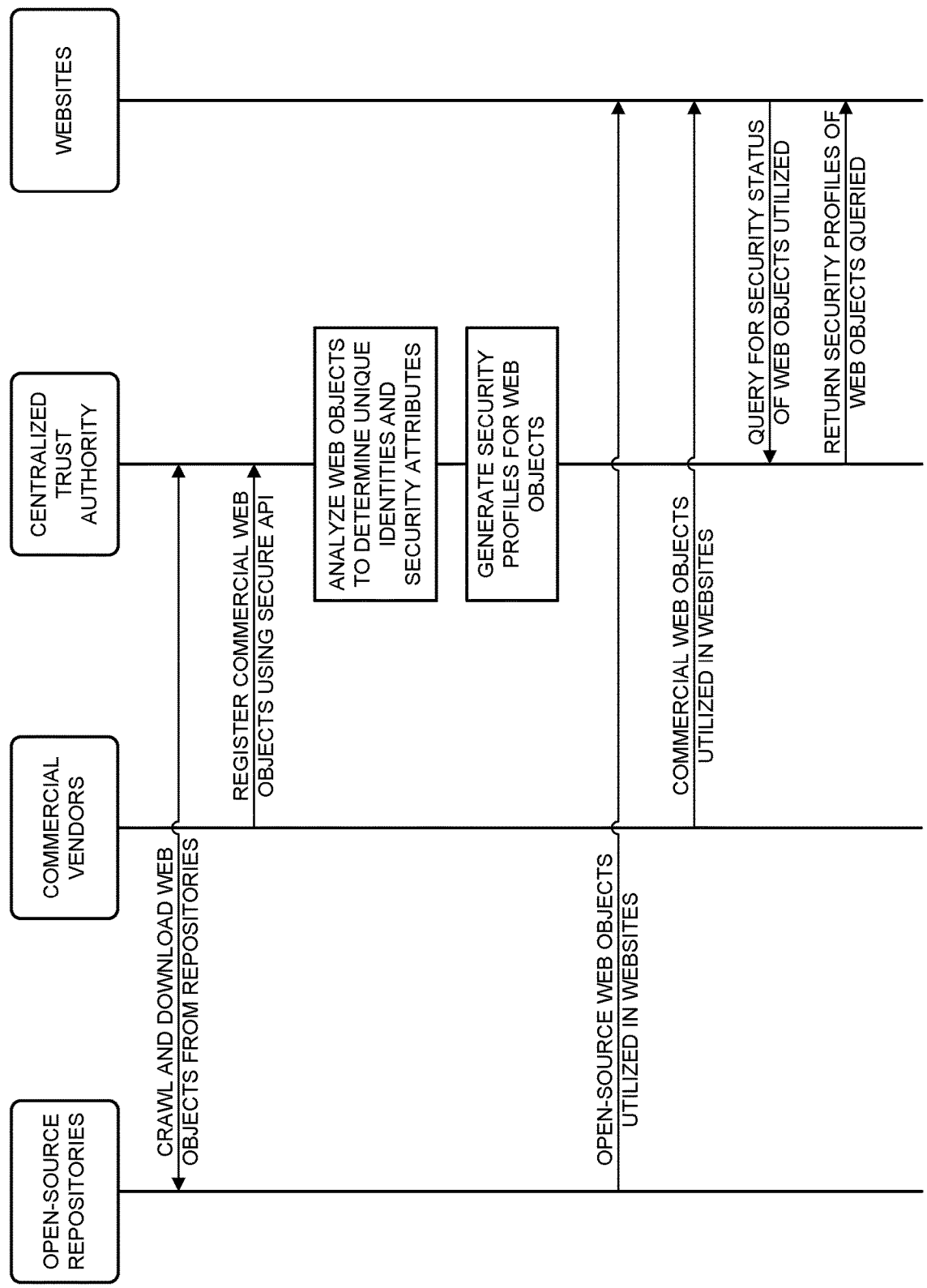
FIG. 4 is a sequence diagram that illustrates an operation of a communication system in an exemplary embodiment.
Figure 5:
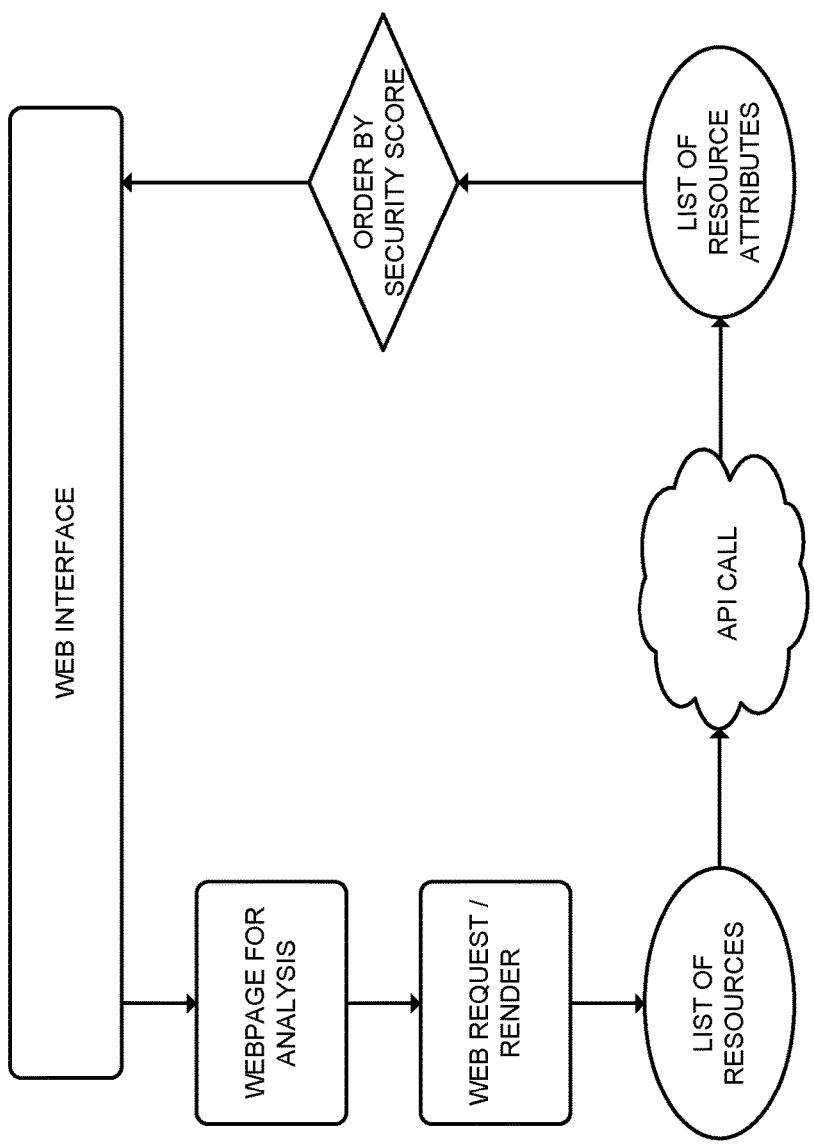
FIG. 5 is a flow diagram that illustrates an operation of a communication system in an exemplary embodiment.
Figure 6:
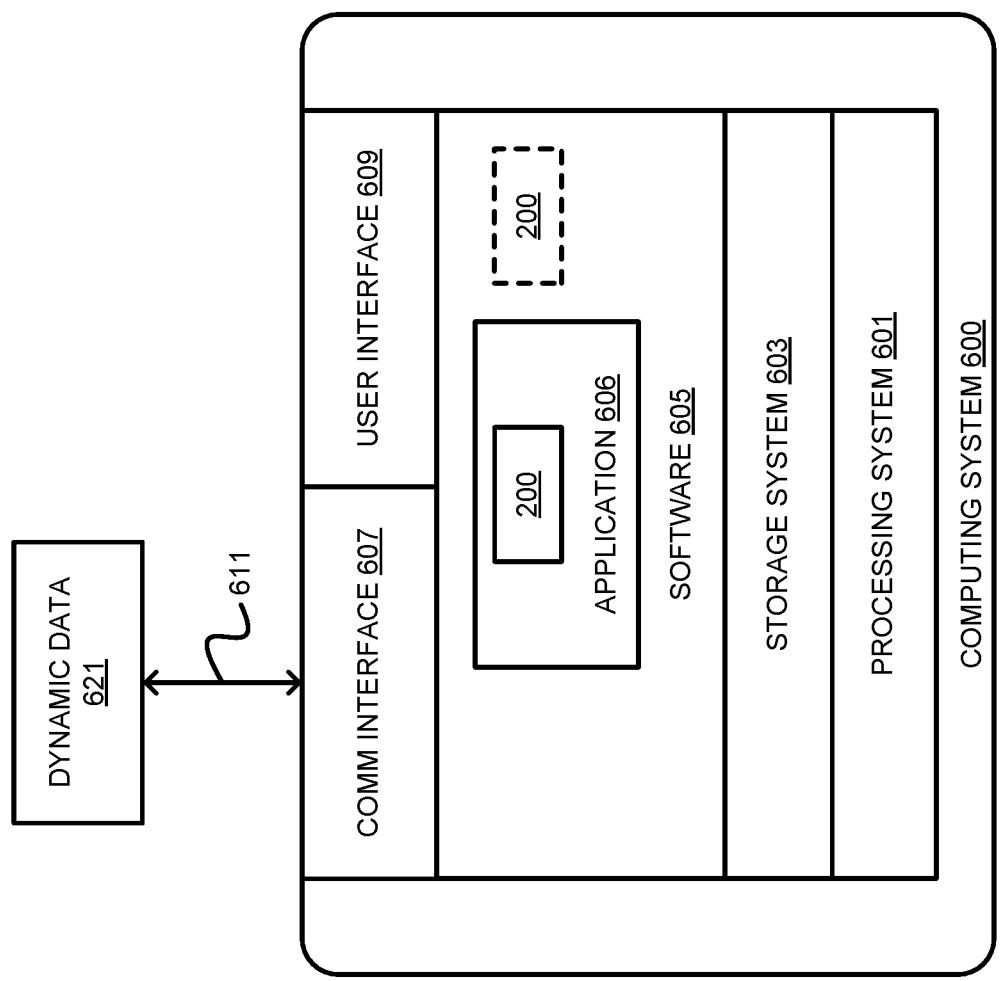
FIG. 6 is a block diagram that illustrates a computing system.

Referring now to the drawings, FIG. 1 illustrates a communication system that may be used to build and operate a centralized trust authority for web application components. FIG. 2 is a flow diagram that illustrates a trust authority operation process that may be performed by a computing system. FIG. 3 illustrates an operation of a centralized trust authority in a communication system. FIG. 4 is a sequence diagram that illustrates an exemplary operation of a centralized trust authority in a communication system to generate security profiles for web objects and respond to queries. FIG. 5 is a flow diagram that illustrates application usage for discovery of potential vulnerabilities in an exemplary embodiment. Finally, FIG. 6 illustrates an exemplary computing system that may be used to perform any of the trust authority operation processes and operational scenarios described herein.

Turning now to FIG. 1, a block diagram of communication system 100 is illustrated. Communication system 100 includes web resources 110, communication network 120, computing system 101, and third-party component producers 130. Web resources 110 and communication network 120 communicate over communication link 111, third-party component producers 130 and communication network 120 communicate over communication link 112, and computing system 101 and communication network 120 communicate over communication link 113. Computing system 101 comprises a centralized trust authority for web resources. In at least one implementation, computing system 101 could comprise a system that provides a cloud-based web service.

In operation, computing system 101 executes a centralized web resource trust authority that provides an advanced resource analysis and threat analytics service to assess a plurality of web resources 110, register components provided by third-party component producers 130, and generate security profiles for all of the web resources 110. Through continuous ingestion of metadata and source code from open-source repositories and vendors of commercial web application components, represented collectively as web resources 110 in this example, and continuous independent assessment of these open-source and commercial components, computing system 101 is able to build and maintain a centralized trust authority that can be queried to determine the integrity and security attributes of any web resources 110 used in constructing web applications. In this example, third-party component producers 130 could comprise any entity involved in the production of web resources 110, which could include content creators, authors, publishers, open-source code contributors, commercial vendors, or any other individual or group involved in the production of web application components. In some cases, third-party component producers 130 may upload or otherwise provide their web objects to the centralized trust authority and/or the web resources 110 repository directly, or may make this content publically available on open-source repositories which may be continuously crawled and downloaded into web resources 110. Third-party component producers 130 may also invoke secure APIs of the trust authority to register or update information about specific components, including integrity hashes, release notes, version numbers, known issues, limitations, and any other relevant information.

Beneficially, the techniques described herein provide a methodology to efficiently obtain security profiles for web resources 110 such as JavaScript files, libraries, fonts, style sheets, and any other web application components. In addition to considering registration information provided by third-party component producers 130, these techniques enable computing system 101 to scalably analyze third-party components using a combination of metadata analysis, static and dynamic runtime analysis, determination of processing sensitive information, and correlation with publicly-available vulnerability databases to determine the risk posed by using these objects in constructing a web application. For example, to build an exhaustive information model for each of the web resources 110, several application analysis techniques may be combined, such as static analysis of source code and/or binary images of the web resources 110, dynamic analysis of a running instance of the web resources 110 in an instrumented environment, dynamic analysis by remotely exercising the web resources 110, metadata analysis, dependency analysis between components, libraries, frameworks, runtime parameters, and service discovery, among other analysis techniques. The combination of analysis techniques may be used to calculate a confidence level about the accuracy and completeness on a per-attribute or per-attribute-class basis for each of the web resources 110, which may also be used in identifying the security risk factors for each of the web resources 110 in some examples. In at least one implementation, when identifying the security risk factors for each of the web resources 110, computing system 101 may utilize the prevalence or absence of the web resources 110 in top ranking websites as a risk factor.

Once the security risk factors and the security profile for each of the web resources 110 are generated, the centralized trust authority may be queried through API calls to retrieve security profiles, reputation scores, and other security attributes for desired web objects identified by one or more fingerprinting algorithms, such as integrity hashes, fuzzy fingerprints, and abstract syntax trees. In addition, the centralized trust authority may utilize the automatically-derived security profiles to inform developers and security personnel before deployment of a web application that incorporates some or all of the web resources 110. The system also has the ability to absorb incremental changes over time, such as the availability of a new version of a library or an entirely brand new library. The security risk factors and security profiles generated for each of the web resources 110 may also allow authors of common libraries and other web application components to understand their work's security posture and areas for improvement. An exemplary implementation for operating a centralized trust authority to register, analyze, and generate security profiles for a plurality of web resources 110 will now be discussed with respect to FIG. 2.

FIG. 2 is a flow diagram that illustrates an operation 200 of communication system 100. The operation 200 shown in FIG. 2 may also be referred to as trust authority operation process 200 herein. The steps of the operation are indicated below parenthetically. The following discussion of operation 200 will proceed with reference to computing system 101 and web resources 110 of FIG. 1 in order to illustrate its operations, but note that the details provided in FIG. 1 are merely exemplary and not intended to limit the scope of process 200 to the specific implementation shown in FIG. 1.

Operation 200 may be employed by computing system 101 to facilitate operation of a centralized trust authority for web application components. As shown in the operational flow of FIG. 2, computing system 101 receives a plurality of web resources 110 used to construct web applications (201). In some examples, the web resources 110 could comprise building blocks for constructing web applications, which may be requested by a client to load a webpage. For example, web resources 110 may include third-party libraries, fonts, style sheets, plugins, tag managers, scripts, or any other web objects. The plurality of web resources 110 may be received by computing system 101 from any source. For example, in at least one implementation, computing system 101 could be configured to crawl and download web resources 110 from open-source web object repositories, such as CDNJS, npm, unpkg, jsDelivr, and other popular repositories. During this data discovery and collection phase, computing system 101 may utilize standard web crawling and scraping techniques to fetch and download all potential web objects, scripts, fonts, style sheets, JavaScript libraries, advertising content, and other web resources 110 from an exhaustive list of CDNs and other data sources. Web resources 110 may also be received by computing system 101 from third-party component producers 130, which could include content creators, authors, publishers, open-source code contributors, commercial vendors, or any other entity involved in the production of web resources 110. In some examples, third-party component producers 130 may upload or otherwise directly provide their web resources 110 to computing system 101 for use with the centralized trust authority. In at least one implementation, the web resources 110 are received by computing system 101 incrementally over time, so that if a new resource is added or an existing resource is updated, the web resources 110 available to computing system 101 are updated as well.

Over a secure API, computing system 101 receives component registration information associated with each of the plurality of web resources 110 provided by producers of the web resources 110 (202). In this example, the producers of the web resources 110 could comprise third-party component producers 130. The component registration information provided by the producers of web resources 110 could include any information associated with web resources 110, including the actual web objects. For example, the component registration information could comprise integrity hashes of each of the web resources 110 provided by the producers of the web resources 110, lists of authorized host domains for each of the web resources 110, version release information for each of the web resources 110, such as version numbers, release notes, known issues, limitations, and any other relevant information. In some implementations, the producers of web resources 110 may invoke the secure API of the centralized trust authority to register or update the component registration information about specific components of web resources 110. Accordingly, in at least one implementation, computing system 101 may receive, over the secure API, updated component registration information associated with at least one of the plurality of web resources 110. Further, through the secure API, the centralized trust authority supports secure workflows for enrollment and delisting of web resource producers, including identity verification and authentication of these resource producers, and enables registration and deregistration of individual components by the producers of web resources 110.

Computing system 101 analyzes the plurality of web resources 110 to determine unique identities and security attributes for each of the web resources 110 (203). In some examples, the unique identities could comprise any identifying information that uniquely describes each of the web resources 110, such as component names, version numbers, exact hashes of the file contents, structural hashes, normalized fingerprints, fuzzy fingerprints, abstract syntax trees, or any other identifying data. In order to determine the unique identities, in some implementations, each of the web resources 110 may be processed by computing system 101 to perform various techniques for uniquely identifying the web objects, such as object fingerprinting algorithms, abstract syntax trees, hash functions, and other data categorization and parsing techniques. For example, in at least one implementation, computing system 101 may analyze the plurality of web resources 110 to determine the unique identities for each of the web resources 110 by computing hashes of each of the web resources 110 to determine the unique identities for each of the web resources 110. In another example, computing system 101 may analyze the syntactic structure of each of the web resources 110 to determine the unique identities for each of the web resources 110. Further, in some implementations the unique identities could comprise normalized fingerprints for each of the web resources 110, which may be normalized with respect to the structure of the web resources 110, in that the normalized fingerprints may be derived from and representative of the syntactic structure of the web resources 110 and the data types of values on the leaf nodes of abstract syntax trees.

In addition, computing system 101 analyzes the plurality of web resources 110 to determine security attributes for each of the web resources 110. In some implementations, to determine the security attributes for each of the web resources 110, computing system 101 may utilize a combination of multiple analysis techniques to extract security-relevant attributes for each of the web resources 110, such as static analysis, dynamic analysis, machine learning, metadata analysis, and domain-specific heuristics. For example, computing system 101 could analyze each of the web resources 110 offline with an automated static analysis and metadata analysis, which may be supplemented with dynamic runtime analysis for each of the web resources 110. Computing system 101 may also analyze and compare each of the web resources 110 against popular vulnerability databases, such as NVD, open-source security platforms, and other vulnerability tracking resources to determine if there are known disclosures of vulnerabilities by vendors against any of the web resources 110. In addition, computing system 101 may analyze each of the web resources 110 using tools that identify outdated libraries, such as RetireJS, among others, and may further refer to data loss prevention (DLP) dictionaries to determine if any sensitive data is manipulated. Other techniques of analyzing the web resources 110 to determine the security attributes for each of the web resources 110 are possible and within the scope of this disclosure.

Computing system 101 identifies a plurality of security risk factors for each of the plurality of web resources 110 based on the component registration information and the security attributes determined for each of the web resources 110 (204). In some implementations, to identify the security risk factors for each of the web resources 110, computing system 101 may analyze and combine information obtained from both the component registration information and the security attributes determined for each of the web resources 110. For example, when determining the security risk factors, computing system 101 could factor in any integrity hashes, release notes, limitations, known issues, domain host reputations, and any other information provided by the producers of web resources 110 included in the component registration information, along with the independent assessment of the security attributes determined for each of the web resources 110. In at least one implementation, computing system 101 may identify the security risk factors for each of the web resources 110 based on prevalence of each of the web resources 110. For example, computing system 101 may determine the prevalence of each of the web resources 110 by identifying how frequently each of these components are utilized by a majority of top ranking websites. The idea of prevalence reduces the security risk factor, so if a particular web resource 110 and/or security attribute is used by a majority of top sites and is highly prevalent, then that reduces the security risk, since so many sites are using it safely. On the contrary, if a particular script, library, or some other web resource 110 is not used by any prominent websites, then the resource or feature is more unknown and could be malicious, so the security risk factor is higher.

Some examples of the security risk factors for each of the web resources 110 include prevalence in the top one million websites, comparison against the NVD, common vulnerabilities and exposures (CVEs), and other open-source security platforms, occurrence and frequency of security incidents, outdated libraries, such as the number of major and/or minor updates or revisions behind a current version, relative age, reputation of the publisher, similarity with adblocker scripts, similarity with privacy snooping scripts, presence of dangerous JavaScript constructs such as the eval function, instances of personally identifiable information (PII) handling, obfuscation measures, such as an assessment of effectiveness of code or PII obfuscation techniques, and any other security risk factors. Note that the above security risk factors are merely exemplary, and many other security risk factors are possible and within the scope of this disclosure.

Computing system 101 generates a security profile for each of the plurality of web resources 110 based on the security risk factors identified for each of the web resources 110 (205). In at least one implementation, the security profiles could include protection policies, known vulnerabilities, integrity hashes, including classifications of integrity violations as benign or malicious, identification of malicious additions or changes to web resources 110, reputation scores, security attributes, security risk factors, and any other security-relevant information associated with each of the web resources 110. In some implementations, to generate the security profiles, computing system 101 may compute a reputation score for each of the web resources 110 based on the security risk factors across a diverse set of security attributes. In at least one implementation, the reputation score could comprise a numerical metric that summarizes the security safety score, such as within a range of zero to one hundred, of a web resource considering the relative weights of the security risk factors, various security attributes, and other features associated with the web resource. For example, computing system 101 could generate a reputation score based on weighted scoring, with the weights assigned based on the relative risk of the security risk factors identified for each of the features of one of the web resources 110. Additionally or alternatively, in at least one implementation, computing system 101 could generate the security profile for each of the web resources 110 based on levels of information gain associated with each of the web resources 110. In some implementations, information gain could be determined by establishing some kind of ground truth and correlating that known truth to each of the features of a particular web resource. For example, different levels of information gain may be determined for particular attributes or features of a web resource when there are one or more known vulnerabilities of the resource. The analysis could then include determining which of the features or attributes of the web resource correlate very highly to the known vulnerability of the resource, so that those features would be given higher relative weights because they provide the most information gain. For example, there may be twenty different features or attributes of a web resource, but the one feature with the highest correlation to the known vulnerability of the resource may be given a weight of fifty percent, based on an analysis and determination of that one feature being responsible for most of the vulnerability of the entire web resource. In this manner, computing system 101 can perform this analysis to determine the information gain of various features, attributes, and security risk factors of web resources 110, and then utilize this information to generate weighted reputation scores for inclusion in the security profiles for each of the web resources 110.

In some implementations, the security attributes, security risk factors, and security profiles for each of the web resources 110 could be stored in a repository maintained by the centralized trust authority executing on computing system 101. The centralized trust authority could include an API that may be utilized to query for the security profile of a web object identified by one or more unique identities, which may include object name, version number, exact hash, structural hash, normalized fingerprint, fuzzy fingerprint, abstract syntax tree, object category, or any other identifying information that uniquely describes each of the web resources 110, including combinations thereof. In such cases, computing system 101 may receive an API call that identifies a web object of a web application. Computing system 101 could then compare the web object to the unique identities for each of the web resources 110 to determine one of the web resources 110 that matches the web object, and return the security profile for the one of the web resources 110 that matches the web object in response to the API call. In at least one implementation, the centralized trust authority supports representational state transfer (REST) APIs to receive queries and retrieve information about web components. In some examples, the centralized trust authority may be queried to retrieve security profile information for specific web components by web developers, IT security personnel, end users, incident responders, risk evaluators, products that automatically enforce policies, or any other uses that would benefit from information about security profiles of various web resources 110.

As discussed above, the queries submitted to the trust authority could specify a particular web component with one or more of name, version, exact hash, structural hash, normalized fingerprint, fuzzy fingerprint, object category, or any other identifying information. Accordingly, in at least one implementation, in order to compare the web object specified in the query to the unique identities for each of the web resources 110 to determine one of the web resources 110 that matches the web object, computing system 101 could first analyze the web object to generate a fingerprint of the web object, and then compare the fingerprint of the web object to the fingerprints for each of the web resources 110 to determine a match. In addition, the fingerprints may be used by computing system 101 to identify nearly identical web objects by ignoring simple syntactical changes like differences in spaces, tabs, commas, simple replacement of values such as changing the values of variables and constants, and the like. Another consideration when comparing the fingerprints of web objects and similar web resources 110 is the data types of variables and constants, such as integer, Boolean, real, long, float, string, and the like. For example, if the types are the same, the normalized fingerprints will match, but if the types of constants and variables on the leaf nodes of the abstract syntax trees change from an integer to a real or a string, then those variations will be noticed. Further, in some implementations fuzzy fingerprints may be utilized, which allow for a higher tolerance of differences between mostly similar web objects and web resources 110. For example, in fuzzy fingerprinting there is some tolerance for minor variations at the leaf nodes of the lower branches of abstract syntax trees, such as a replacement of an integer for a real number, tolerating further variations such as string constants changed to string variables, changes over time in some data points or constant values, and other small variations. The degree of acceptable tolerance for minor differences when comparing fuzzy fingerprints or any other unique identities could be altered based on the security needs of individual users.

Advantageously, the techniques disclosed herein provide for efficiently determining security characteristics, risk factors, and security profiles for web resources 110 that are used in construction of web applications, such as libraries, fonts, style sheets, JavaScript files, and other web objects. A centralized trust authority, which may operate as a cloud service, provides a single source of truth about the security attributes of various web resources 110 utilized in the construction of modern websites. Computing system 101 may operate the centralized trust authority to scalably analyze millions of popular third-party web components using a combination of static analysis, metadata analysis, dynamic runtime analysis, determination of processing sensitive information, and correlation with publicly available vulnerability databases to determine the security risk posed by using these objects in building web applications. The centralized trust authority covers both open-source components hosted at publically accessible repositories as well as commercial web objects hosted and supported by vendors. Based on component registration information provided by producers of web resources 110, the trust authority maintains the latest information on all legitimate changes to web resources 110 stored in a scalable repository, along with automatically-derived as well as vendor-provided security characteristics of millions of third-party web application components. The centralized trust authority utilizes secure mechanisms for enrolling vendors and other component producers, registering web application components, deriving security characteristics, and servicing queries from consumers, such as web application developers, IT security personnel, end users, products that automatically enforce security policies, incident responders, risk evaluators, and others. The trust authority also has the ability to absorb incremental changes over time through continuous updates to the scalable repository with security characteristics of new objects and newly discovered security attributes of millions of existing objects. Further, by preemptively detecting malicious exploits and other anomalies in web application components, the centralized trust authority can provide zero-day vulnerability protection for modern web applications. Accordingly, by accepting queries received through API calls to retrieve the security profiles for any desired web objects, the centralized trust authority provides the definitive, universal standard and go-to source for validating web application components, providing a single source of truth about the security attributes of various building blocks utilized extensively at top ranking websites. Another exemplary operation of a centralized trust authority executing in a web communication system will now be discussed with respect to FIG. 3.

FIG. 3 is a block diagram that illustrates an operation of communication system 300 in an exemplary embodiment. The techniques described below with respect to FIG. 3 could also be executed by the systems of communication system 100 such as computing system 101, and could be combined with operation 200 of FIG. 2 in some implementations.

Communication system 300 describes the interactions between various web resource producers and the websites that incorporate those resources into their sites. The web resource producers could comprise any entity involved in the production of web resources, which could include content creators, authors, publishers, open-source code contributors, commercial vendors, or any other individual or group involved in the production of web application components. In this example, the web resource producers include open-source code repositories such as CDNJS, commercial vendors of web application components, and third-party services such as analytics, user tracking, marketing, and advertising. The websites that employ these web resources could comprise any web applications, but in this example, the websites include an online retailer, a financial services application, a healthcare provider, an insurance carrier, and a startup company. Each of these websites are shown as incorporating web resources provided from the open-source code repositories, commercial vendors of web application components, and third-party services. Because of the inclusion of these third-party components in the web applications provided by the websites, in the absence of proper vetting of third-party executable content, users of the web applications may be exposed to potentially compromised or malicious code.

In order to help protect against such security threats, a centralized web resource trust authority, operating as a cloud service, operates to ingest, maintain, and deliver security attributes and integrity information for millions of web resource objects. The centralized trust authority provides an advanced resource analysis and threat analytics service. In operation, the web resource producers register their respective components with the centralized trust authority. For example, the web resource producers may invoke secure APIs of the centralized trust authority to register or update information about specific components, including integrity hashes, release notes, version numbers, known issues, limitations, and any other relevant information. In some cases, the web resource producers may upload or otherwise provide their web objects to the centralized trust authority directly, or may make this content publically available on open-source repositories which may be continuously crawled and downloaded by the centralized trust authority. Further, through the secure APIs, the centralized trust authority supports a secure workflow for enrollment and delisting of the web resource producers, including identity verification and authentication, and enables registration and deregistration of individual components. After the web resources are registered, the centralized trust authority analyzes the individual components and generates security profiles for all of the web resources. When performing this analysis, the centralized trust authority may utilize a combination of multiple analysis techniques, including static analysis, dynamic analysis, machine learning, metadata analysis, dependency analysis, domain-specific heuristics, and other analysis techniques. Through continuous ingestion of metadata and source code from open-source repositories and vendors of commercial web application components, and continuous independent assessment of these open-source and commercial components, the centralized trust authority maintains a scalable repository that can be queried to determine the integrity information and security profiles of any web resources used in constructing web applications. For example, the centralized trust authority may be queried to retrieve the security profile information for specific web components by web developers, IT security personnel, end users, incident responders, risk evaluators, products that automatically enforce policies, or any other uses that would benefit from information about security profiles of the various web resources. In this manner, the centralized trust authority can effectively deliver trust-based security policies determined for each of the web resources to website owners, developers, third-party security platforms, or any other entities that desire this information. Another exemplary operation of the centralized trust authority of communication system 300 will now be discussed with respect to FIG. 4.

FIG. 4 is a sequence diagram that that illustrates an operation of communication system 300 in an exemplary embodiment. The operation of FIG. 4 describes the operation of a centralized trust authority to register and analyze web objects for generating security profiles, which may then be delivered to requesting entities in response to queries using secure APIs. Although the following description of FIG. 4 will proceed with reference to elements of communication system 300 of FIG. 3 in this example, the techniques described below with respect to FIG. 4 could also be executed by the systems of communication system 100 such as computing system 101, and could be combined with operation 200 of FIG. 2 in some implementations.

Initially, the centralized trust authority crawls open-source code repositories and downloads publically available web objects. In some examples, the open-source code repositories could be identified by processing various lists of resources, such as a top websites list, web resources package list, JavaScript library package list, and any other resource lists, which may be parsed and entered into a uniform resource locator (URL) database. The URLs in the URL database can then be processed to extract source data for web requests and renders for all of the top websites in the list, along with each package identified in the web resources package list and the JavaScript library package list, and any other source data that can be extracted from other CDNs. This aggregated source data is then analyzed and the results of the source analysis are stored in an analysis database. The web resources package list and the JavaScript library package list are also processed to extract the identified resources for analysis, along with public code repositories, such as CDNJS, npm, unpkg, jsDelivr, and other open-source repositories. A vulnerabilities database is also populated with data from NVD, Snyk, and other vulnerability databases, along with outdated libraries databases such as RetireJS and others.

Once the various sources for obtaining the web resources are identified, the centralized trust authority utilizes web crawling and scraping techniques to fetch and download all potential web objects, such as scripts, JavaScript libraries, fonts, style sheets, advertising content, and any other web content from this exhaustive list of CDNs. In the case of commercially sold web application components, commercial vendors may register their commercial web objects with the centralized trust authority using secure APIs. For example, commercial vendors may invoke the secure APIs of the centralized trust authority to register or update information about specific web resource components. The registration information provided by the web resource producers when registering with the trust authority could include integrity hashes, lists of authorized host domains, version release information, such as version numbers, release notes, known issues, limitations, and any other relevant information. During the registration process, the commercial vendors may upload or otherwise provide their commercial web objects to the centralized trust authority directly.

Once the centralized trust authority has acquired all of the web objects from both commercial vendors and open-source repositories, each object is analyzed to determine unique identities and security attributes for each of the web objects. For example, the web objects may be analyzed offline with an automated static and metadata analysis, which may be supplemented with dynamic analysis attributes determined as the same components are encountered in periodic crawling of top websites. In some examples, several application analysis techniques may be combined, such as static analysis of source code and/or binary images of the web resources, dynamic analysis of a running instance of the web objects in an instrumented environment, dynamic analysis by remotely exercising the web objects, metadata analysis, dependency analysis between components, libraries, frameworks, runtime parameters, and service discovery, among other analysis techniques. Each object obtained from the crawling and scraping and/or registration process is passed on to a system that performs various techniques for extracting the security attributes of the web objects. Object fingerprinting algorithms and the creation of abstract syntax trees may be utilized in order to determine the unique identities for each of the web objects and carry out the attribute extraction techniques. A ranking of each object is obtained by evaluating the frequency, consistency, and popularity across the most browsed websites in the world. In one example, this may be limited to the top one million websites based on user traffic. This ranking task is performed on a periodic basis to constantly keep up to date with the present web environment. Each of the above findings for an object are passed through different vulnerability databases, such as NVD, Snyk, and others, to determine which objects have potential security weaknesses, their severity, ease of exploit, and other vulnerabilities. Each of the above findings for an object are passed through different outdated libraries databases, such as RetireJS, to determine which objects rely on older versions of libraries that can have potential security weaknesses. More secure replacements of such objects are also made if necessary. Each JavaScript library is parsed to check for the presence of known dangerous JavaScript constructs, and appropriately noted for severity and ease of exploit of any such vulnerability. Each JavaScript library is also parsed to understand the behavior of any data collection, specifically any PII of users. The exact nature of the data collected is noted for each web object.

Based on analyzing the above findings, a security profile is then generated for each web object, which in some cases may include a security reputation score calculated for each of the objects. In some examples, the security profiles could include protection policies, known vulnerabilities, integrity hashes, including classifications of integrity violations as benign or malicious, identification of malicious additions or changes to the web objects, reputation scores, security attributes, security risk factors, and any other security-relevant information associated with each of the web objects. All of the collected information, including any security attributes determined, security risk factors identified, and security profiles generated for each of the web objects are stored in a large, scalable security data repository managed and maintained by the centralized trust authority. On a periodic basis, the information stored in the repository may be updated by repeating the above methodology. The scope of the repository is also increased and updated based on incoming requests to the centralized trust authority.

A data retrieval system is provided by the centralized trust authority so that end users can access the information in the data repository using secure APIs. After the security profiles for the web objects are generated, various websites that utilize the open-source and commercial web objects in the construction of their websites may submit queries to the centralized trust authority to determine the security status of the web objects they are utilizing. The centralized trust authority would then return the security profiles of the web objects identified in the queries. For example, manual monitoring by a web developer or security personnel of a website may be employed to obtain the security status of all web objects used by the website. Initially, the website to secure may be crawled to extract a complete list of resources, including all JavaScript libraries used, all scripts present, web resources utilized, and the like. The security information for each of these objects is requested by performing API queries to the centralized trust authority. The trust authority retrieves the information regarding the objects and returns the requested information. In the unlikely event that the information for the object is not present, the system will generate the report in the same manner as described above in the data-acquisition and analysis phase, and deliver this information. The developer or security personnel will now have a comprehensive security posture of all the web resources that are being used under that website. Appropriate steps can be taken by these personnel regarding the information obtained, such as replacing an insecure web resource with a more secure alternative, upgrading from a deprecated library to a newer version of the same, and any other security actions. The developer or security personnel can set preferences in terms of security score thresholds, deviations in behavior alerts, security profile delivery schedule or frequency of information updates, and any other options.

The centralized trust authority can also provide continuous monitoring of a website or web application. When continuous monitoring is provided by the centralized trust authority, a website that the system is protecting may be periodically scanned by the trust authority and analyzed as described above. The results of the analysis of the system are generated for the developer or security personnel for abnormality and for security audit purposes of the website. In the scenario that the system determines a security score that exceeds a threshold, which may be previously configured as discussed above, alerts may be sent to the appropriate personnel along with recommended suggestions. Upon receiving an alert, appropriate steps can be taken by these personnel regarding the information obtained, such as replacing an insecure web resource with a more secure alternative, upgrading from a deprecated library to a newer version of the same, and any other security actions. In this manner, security of the website is more robust, and the website is better protected against malicious attacks and vulnerabilities. A flow diagram that illustrates application usage for discovery of potential vulnerabilities will now be discussed with respect to FIG. 5.

FIG. 5 is a flow diagram that illustrates an operation of a communication system 500 in an exemplary embodiment. The operation of communication system 500 illustrates application usage for discovery of potential vulnerabilities through the operation of a web interface of the application. The techniques described below with respect to FIG. 5 could be executed by the systems of communication system 100 such as computing system 101, and could be combined with operation 200 of FIG. 2 in some implementations.

Initially, a website owner, developer, security personnel, or any other end user accesses a web interface of a web application that enables the discovery of potential vulnerabilities of a webpage. Using the web interface, the user supplies the webpage for analysis. Web crawling and scraping techniques are employed to fetch and download all web objects that are used in the webpage, including all JavaScript libraries used, all scripts present, web resources utilized, and the like, and a complete list of the resources used in constructing the webpage is extracted. For each of the resources identified in the list, security information for each of these resources is requested by performing API calls to the centralized trust authority to retrieve the security profiles of each resource, which may include security attributes, security risk factors, and security reputation scores in some implementations. The centralized trust authority retrieves the information regarding the resources and returns the security profiles of each resource, which are then provided to the user via the web interface. The user will now have a comprehensive security posture of all the web resources that are being used under that webpage. Appropriate steps can be taken by the user regarding the information obtained, such as replacing an insecure web resource with a more secure alternative, upgrading from a deprecated library to a newer version of the same, and any other security actions. In this manner, the webpage is afforded improved security and protection against malicious attacks and other vulnerabilities.

Now referring back to FIG. 1, computing system 101 may be representative of any computing apparatus, system, or systems on which the techniques disclosed herein or variations thereof may be suitably implemented. Computing system 101 comprises a processing system and communication transceiver. Computing system 101 may also include other components such as a router, server, data storage system, and power supply. Computing system 101 may reside in a single device or may be distributed across multiple devices. Computing system 101 be a discrete system or may be integrated within other systems, including other systems within communication system 100. Some examples of computing system 101 include desktop computers, server computers, cloud computing platforms, and virtual machines, as well as any other type of computing system, variation, or combination thereof. In some examples, computing system 101 could comprise a network switch, router, switching system, packet gateway, network gateway system, Internet access node, application server, database system, service node, firewall, or some other communication system, including combinations thereof.

Web resources 110 may be representative of any computing apparatus, system, or systems that may connect to another computing system over a communication network. Web resources 110 may comprise a data storage system and communication transceiver. Web resources 110 may also include other components such as a processing system, router, server, and power supply. Web resources 110 may reside in a single device or may be distributed across multiple devices. Web resources 110 may be a discrete system or may be integrated within other systems, including other systems within communication system 100. Some examples of web resources 110 include database systems, desktop computers, server computers, cloud computing platforms, and virtual machines, as well as any other type of computing system, variation, or combination thereof.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, packet networks, local area networks (LAN), metropolitan area networks (MAN), wide area networks (WAN), or other network topologies, equipment, or systems, including combinations thereof. Communication network 120 may be configured to communicate over wired or wireless communication links. Communication network 120 may be configured to use time-division multiplexing (TDM), Internet Protocol (IP), Ethernet, optical networking, wireless protocols, communication signaling, or some other communication format, including combinations thereof. In some examples, communication network 120 includes further access nodes and associated equipment for providing communication services to several computer systems across a large geographic region.

Third-party component producers 130 may be representative of any computing apparatus, system, or systems that may connect to another computing system over a communication network. Third-party component producers 130 may comprise a data storage system and communication transceiver. Third-party component producers 130 may also include other components such as a processing system, router, server, and power supply. Third-party component producers 130 may reside in a single device or may be distributed across multiple devices. Third-party component producers 130 may be a discrete system or may be integrated within other systems, including other systems within communication system 100. Some examples of third-party component producers 130 include database systems, desktop computers, server computers, cloud computing platforms, and virtual machines, as well as any other type of computing system, variation, or combination thereof.

Communication links 111-113 use metal, air, space, optical fiber such as glass or plastic, or some other material as the transport medium, including combinations thereof. Communication links 111-113 could use various communication protocols, such as TDM, IP, Ethernet, telephony, optical networking, hybrid fiber coax (HFC), communication signaling, wireless protocols, or some other communication format, including combinations thereof. Communication links 111-113 could be direct links or may include intermediate networks, systems, or devices.

Turning now to FIG. 6, a block diagram is shown that illustrates computing system 600 in an exemplary implementation. Computing system 600 provides an example of computing system 101, or any computing system that may be used to execute trust authority operation process 200 or variations thereof, although computing system 101 could use alternative configurations. Computing system 600 includes processing system 601, storage system 603, software 605, communication interface 607, and user interface 609. User interface 609 comprises display system 608. Software 605 includes application 606 which itself includes trust authority operation process 200. Trust authority operation process 200 may optionally be implemented separately from application 606, as indicated by the dashed line in FIG. 6.

Computing system 600 may be representative of any computing apparatus, system, or systems on which application 606 and trust authority operation process 200 or variations thereof may be suitably implemented. Examples of computing system 600 include mobile computing devices, such as cell phones, tablet computers, laptop computers, notebook computers, and gaming devices, as well as any other type of mobile computing devices and any combination or variation thereof. Note that the features and functionality of computing system 600 may apply as well to desktop computers, server computers, and virtual machines, as well as any other type of computing system, variation, or combination thereof.

Computing system 600 includes processing system 601, storage system 603, software 605, communication interface 607, and user interface 609. Processing system 601 is operatively coupled with storage system 603, communication interface 607, and user interface 609. Processing system 601 loads and executes software 605 from storage system 603. When executed by computing system 600 in general, and processing system 601 in particular, software 605 directs computing system 600 to operate as described herein for trust authority operation process 200 or variations thereof. Computing system 600 may optionally include additional devices, features, or functionality not discussed herein for purposes of brevity.

Referring still to FIG. 6, processing system 601 may comprise a microprocessor and other circuitry that retrieves and executes software 605 from storage system 603. Processing system 601 may be implemented within a single processing device but may also be distributed across multiple processing devices or sub-systems that cooperate in executing program instructions. Examples of processing system 601 include general purpose central processing units, application specific processors, and logic devices, as well as any other type of processing device, combinations, or variations thereof.

Storage system 603 may comprise any computer-readable storage media capable of storing software 605 and readable by processing system 601. Storage system 603 may include volatile and nonvolatile, removable and non-removable media implemented in any method or technology for storage of information, such as computer readable instructions, data structures, program modules, or other data. Storage system 603 may be implemented as a single storage device but may also be implemented across multiple storage devices or sub-systems co-located or distributed relative to each other. Storage system 603 may comprise additional elements, such as a controller, capable of communicating with processing system 601. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 609, processing system 601 may load and execute portions of software 605, such as trust authority operation process 200, to render a graphical user interface for application 606 for display by display system 608 of user interface 609. Software 605 may be implemented in program instructions and among other functions may, when executed by computing system 600 in general or processing system 601 in particular, direct computing system 600 or processing system 601 to receive a plurality of web resources used to construct web applications. Software 605 may further direct computing system 600 or processing system 601 to receive, over a secure application programming interface (API), component registration information associated with each of the plurality of web resources provided by producers of the web resources. In addition, software 605 directs computing system 600 or processing system 601 to analyze the plurality of web resources to determine unique identities and security attributes for each of the web resources. Software 605 may further direct computing system 600 or processing system 601 to identify a plurality of security risk factors for each of the plurality of web resources based on the component registration information and the security attributes determined for each of the web resources. Finally, software 605 may direct computing system 600 or processing system 601 to generate a security profile for each of the plurality of web resources based on the security risk factors identified for each of the web resources.

Software 605 may include additional processes, programs, or components, such as operating system software or other application software. Examples of operating systems include Windows®, iOS®, and Android®, as well as any other suitable operating system. Software 605 may also comprise firmware or some other form of machine-readable processing instructions executable by processing system 601.

In general, software 605 may, when loaded into processing system 601 and executed, transform computing system 600 overall from a general-purpose computing system into a special-purpose computing system customized to facilitate operation of a centralized trust authority for web application components as described herein for each implementation. For example, encoding software 605 on storage system 603 may transform the physical structure of storage system 603. The specific transformation of the physical structure may depend on various factors in different implementations of this description. Examples of such factors may include, but are not limited to the technology used to implement the storage media of storage system 603 and whether the computer-storage media are characterized as primary or secondary storage.

In some examples, if the computer-storage media are implemented as semiconductor-based memory, software 605 may transform the physical state of the semiconductor memory when the program is encoded therein. For example, software 605 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 600 is generally intended to represent a computing system with which software 605 is deployed and executed in order to implement application 606 and/or trust authority operation process 200 (and variations thereof). However, computing system 600 may also represent any computing system on which software 605 may be staged and from where software 605 may be distributed, transported, downloaded, or otherwise provided to yet another computing system for deployment and execution, or yet additional distribution. For example, computing system 600 could be configured to deploy software 605 over the internet to one or more client computing systems for execution thereon, such as in a cloud-based deployment scenario.

Communication interface 607 may include communication connections and devices that allow for communication between computing system 600 and other computing systems (not shown) or services, over a communication network 611 or collection of networks. In some implementations, communication interface 607 receives dynamic data 621 over communication network 611. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 609 may include a voice input device, a touch input device for receiving a gesture from a user, a motion input device for detecting non-touch gestures and other motions by a user, and other comparable input devices and associated processing elements capable of receiving user input from a user. Output devices such as display system 608, speakers, haptic devices, and other types of output devices may also be included in user interface 609. The aforementioned user input devices are well known in the art and need not be discussed at length here. User interface 609 may also include associated user interface software executable by processing system 601 in support of the various user input and output devices discussed above. Separately or in conjunction with each other and other hardware and software elements, the user interface software and devices may provide a graphical user interface, a natural user interface, or any other kind of user interface. User interface 609 may be omitted in some examples.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a computing system to facilitate operation of a centralized trust authority for web application components, the method comprising:
   receiving a plurality of web resources used to construct web applications;
   receiving, over a secure application programming interface (API), component registration information associated with each of the plurality of web resources provided by producers of the plurality of web resources;
   analyzing the plurality of web resources to determine unique identities and security attributes for each of the plurality of web resources;
   identifying a plurality of security risk factors for each of the plurality of web resources based on the component registration information and the security attributes determined for each of the plurality of web resources;
   generating a security profile for each of the plurality of web resources based on the plurality of security risk factors identified for each of the plurality of web resources;
   receiving an API call that identifies a web object of a web application;
   comparing the web object to the unique identities for each of the plurality of web resources to determine one of the plurality of web resources that matches the web object; and
   returning the security profile for the one of the plurality of web resources that matches the web object.

2. The method of claim 1 wherein the unique identities for each of the plurality of web resources comprise fingerprints for each of the plurality of web resources, and wherein comparing the web object to the unique identities for each of the plurality of web resources to determine the one of the plurality of web resources that matches the web object comprises comparing a fingerprint of the web object to the fingerprints for each of the plurality of web resources to determine the one of the plurality of web resources that matches the web object.

3. The method of claim 1 wherein analyzing the plurality of web resources to determine the unique identities for each of the plurality of web resources comprises computing hashes of each of the plurality of web resources to determine the unique identities for each of the plurality of web resources.

4. The method of claim 1 further comprising receiving, over the secure API, updated component registration information associated with at least one of the plurality of web resources.

5. The method of claim 1 wherein the component registration information comprises integrity hashes of each of the plurality of web resources provided by the producers of the plurality of web resources.

6. The method of claim 1 wherein the component registration information comprises lists of authorized host domains for each of the plurality of web resources.

7. The method of claim 1 wherein the component registration information comprises version release information for each of the plurality of web resources.

8. One or more computer-readable storage media having program instructions stored thereon to facilitate operation of a centralized trust authority for web application components, wherein the program instructions, when executed by a computing system, direct the computing system to perform operations, the operations comprising:
   receiving a plurality of web resources used to construct web applications;
   receiving, over a secure application programming interface (API), component registration information associated with each of the plurality of web resources provided by producers of the plurality of web resources;
   analyzing the plurality of web resources to determine unique identities and security attributes for each of the plurality of web resources;
   identifying a plurality of security risk factors for each of the plurality of web resources based on the component registration information and the security attributes determined for each of the plurality of web resources;

generating a security profile for each of the plurality of web resources based on the plurality of security risk factors identified for each of the plurality of web resources;

receiving an API call that identifies a web object of a web application;

comparing the web object to the unique identities for each of the plurality of web resources to determine one of the plurality of web resources that matches the web object; and returning the security profile for the one of the plurality of web resources that matches the web object.

9. The one or more computer-readable storage media of claim 8 wherein the unique identities for each of the plurality of web resources comprise fingerprints for each of the plurality of web resources, and wherein comparing the web object to the unique identities for each of the plurality of web resources to determine the one of the plurality of web resources that matches the web object comprises comparing a fingerprint of the web object to the fingerprints for each of the plurality of web resources to determine the one of the plurality of web resources that matches the web object.

10. The one or more computer-readable storage media of claim 8 wherein analyzing the plurality of web resources to determine the unique identities for each of the plurality of web resources comprises computing hashes of each of the plurality of web resources to determine the unique identities for each of the plurality of web resources.

11. The one or more computer-readable storage media of claim 8 wherein the operations further comprise receiving, over the secure API, updated component registration information associated with at least one of the plurality of web resources.

12. The one or more computer-readable storage media of claim 8 wherein the component registration information comprises integrity hashes of each of the plurality of web resources provided by the producers of the plurality of web resources.

13. The one or more computer-readable storage media of claim 8 wherein the component registration information comprises lists of authorized host domains for each of the plurality of web resources.

14. The one or more computer-readable storage media of claim 8 wherein the component registration information comprises version release information for each of the plurality of web resources.

15. An apparatus comprising:
one or more computer-readable storage media;
a processing system operatively coupled with the one or more computer-readable storage media; and
program instructions stored on the one or more computer-readable storage media that, when executed by the processing system, direct the processing system to perform operations, the operations comprising:

receiving a plurality of web resources used to construct web applications;

receiving, over a secure application programming interface (API), component registration information associated with each of the plurality of web resources provided by producers of the plurality of web resources;

analyzing the plurality of web resources to determine unique identities and security attributes for each of the plurality of web resources;

identifying a plurality of security risk factors for each of the plurality of web resources based on the component registration information and the security attributes determined for each of the plurality of web resources;

generating a security profile for each of the plurality of web resources based on the plurality of security risk factors identified for each of the plurality of web resources;

receiving an API call that identifies a web object of a web application;

comparing the web object to the unique identities for each of the plurality of web resources to determine one of the plurality of web resources that matches the web object; and returning the security profile for the one of the plurality of web resources that matches the web object.

16. The apparatus of claim 15 wherein the unique identities for each of the plurality of web resources comprise fingerprints for each of the plurality of web resources, and wherein comparing the web object to the unique identities for each of the plurality of web resources to determine the one of the plurality of web resources that matches the web object comprises comparing a fingerprint of the web object to the fingerprints for each of the plurality of web resources to determine the one of the plurality of web resources that matches the web object.

17. The apparatus of claim 15 wherein analyzing the plurality of web resources to determine the unique identities for each of the plurality of web resources comprises computing hashes of each of the plurality of web resources to determine the unique identities for each of the plurality of web resources.

18. The apparatus of claim 15 wherein the operations further comprise receiving, over the secure API, updated component registration information associated with at least one of the plurality of web resources.

19. The apparatus of claim 15 wherein the component registration information comprises integrity hashes of each of the plurality of web resources provided by the producers of the plurality of web resources.

20. The apparatus of claim 15 wherein the component registration information comprises lists of authorized host domains for each of the plurality of web resources.

\* \* \* \* \*